UNITED STATES PATENT OFFICE.

WEBESTER F. TRAVES, OF CLEVELAND, OHIO.

TIRE-HEALING COMPOSITION.

1,317,111.

Specification of Letters Patent. Patented Sept. 23, 1919.

No Drawing. Application filed November 1, 1916. Serial No. 128,904.

*To all whom it may concern:*

Be it known that I, WEBESTER F. TRAVES, citizen of the United States, residing at Cleveland, in the county of Cuyahoga and State of Ohio, have invented certain new and useful Improvements in Tire-Healing Compositions, of which the following is a specification.

This invention relates to compositions for automatically sealing or repairing punctures or leaks in pneumatic tires used on automobiles, bicycles and the like. The object of the invention is to provide an improved composition of this kind which is compounded from ordinary ingredients readily obtainable at fairly low cost in the open market; which is of an even fluid consistency so that it can be easily handled in packaging the goods and inserting the composition into the tire; which has sufficient body to fill and close an ordinary puncture; which is so compounded as to have a homogeneous composition; which does not deteriorate or harden inside the tire but quickly solidifies when exposed to the outside air by a puncture or leak; which is of a sticky or tacky nature so that it clings to the inner surface of the tube ready for any emergency; and which is not injurious to the rubber or fabric of the tire.

Further objects of the invention are in part obvious and in part will appear more in detail hereinafter.

The invention comprises the composition hereinafter described and claimed.

The composition comprises a number of different ingredients used for different purposes and to produce different effects, the whole being combined into a uniform or homogeneous mass which is of liquid form suitable for insertion into the tire through the air valve body. The composition requires a body material, an oil to prevent drying, an ingredient to produce a jelly like consistency, a non-freezing carrier for keeping the ingredients thoroughly mixed, a preservative and a reagent for neutralizing acids without affecting the rubber, a sticky or tacky agent, and a fluid vehicle.

A suitable body material capable of being used is paraffin or a similar product, which may be used in amounts from 5 to 10%. This material becomes dissolved or incorporated in the other ingredients so that it disappears as a solid and is distributed thoroughly. The body may also be said to include a vegetable oil, such as linseed oil. This material is used in amounts from 5 to 12%. By its oily nature it prevents the mixture from drying or hardening in the tire, but when said mixture works out through a puncture the oil hardens into semisolid form and prevents the formed plug from becoming brittle. A material having purposes allied to the paraffin and linseed oil is gelatin which furnishes heavy body, maintains the jelly like or gelatinous consistency and prevents complete solidification of the mixture into a hard mass on drying in the open air. The gelatin in the mass is generally used in larger quantities than the other ingredients, say from 10 to 40%.

Freezing of the mass in cold weather is prevented by the use of glycerin, which has the consistency of heavy syrup and tends to keep the other ingredients thoroughly distributed throughout the mass and maintains its homogeneous composition. The glycerin may vary from 5 to 10%.

The mixture also requires a sticky or tacky substance, such as will cause it to adhere to the inner surface of the tire or tube in which it is placed, and not run freely to the bottom when the wheel is stationary. A suitable substance for this purpose is a resin which dissolves or mixes with the other ingredients and may vary in quantity from 2 to 4%.

An active preservative agent, such as common salt, is also used. This material prevents deterioration of the other substances and lends some body to the mixture. It may vary somewhat but runs fairly close to 7%.

Caustic soda, in stick form, is also added to the mixture. This substance is non-injurious to rubber, in fact protects it, and will neutralize or eliminate any acids which may be present, either in the tire or in the other substances in the mixture. The caustic soda may vary from 8 or 10 to 30% depending upon other ingredients.

The fluid vehicle preferred is water, which not only is inexpensive but also is absolutely neutral and will not affect rubber or other substances. It acts as a carrier for the body materials and as a solvent for the salt, caustic soda, and gelatin. Water is always used in quantities sufficient to make up the 100%.

I have found from experience that one formula suitable for use and serving as an efficient protection against tire injuries is as follows, the percentage given being approximate within a few per cent.:

| | |
|---|---|
| Gelatin | 20 |
| Linseed oil | 5 |
| Glycerin | 5 |
| Paraffin | 5 |
| Resin | 3 |
| Caustic soda | 10 |
| Salt | 7 |

Water sufficient to make 100%.

The mixture described is forced into the tire in an amount sufficient to form a thin film over its inner surface. It deposits in greater amounts on the tread portion, where the greatest liability to puncture occurs. If any puncture or leak is produced the mixture follows through the opening and by contact with the outside air hardens into a semi-solid gummy mass like soft rubber, which furnishes an efficient stopper for the leak. The material is easily compounded from ordinary ingredients and can be sold at comparatively low cost.

What I claim is:

1. A tire composition resulting from the combination of substances in proportion substantially as follows:

| | |
|---|---|
| Gelatin | 10 to 40% |
| Linseed oil | 5 to 12% |
| Glycerin | 5 to 10% |
| Paraffin | 5 to 10% |
| Resin | 2 to 4% |
| Caustic soda | 10 to 30% |
| Salt—approximately | 7% |

Water sufficient to make 100%.

2. A tire composition resulting from the combination of substances in proportion substantially as follows:

| | |
|---|---|
| Gelatin | 20 |
| Linseed oil | 5 |
| Glycerin | 5 |
| Paraffin | 5 |
| Resin | 3 |
| Caustic soda | 10 |
| Salt | 7 |

Water sufficient to make 100%.

In testimony whereof I affix my signature.

WEBESTER F. TRAVES.